Sept. 9, 1941.    L. M. DIXON    2,255,105
COLLOIDAL MILL
Filed Feb. 17, 1941
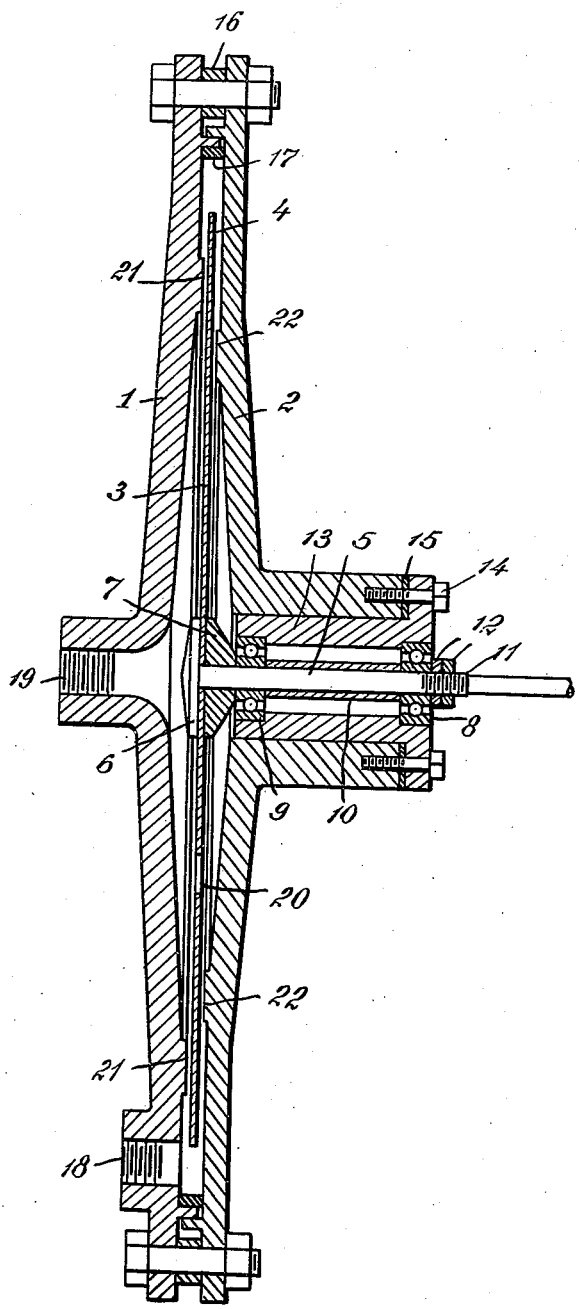
LEWIS M. DIXON
INVENTOR
BY Cloyd M. Chapman
ATTORNEY Patented Sept. 9, 1941

2,255,105

UNITED STATES PATENT OFFICE 2,255,105

COLLOIDAL MILL

Lewis M. Dixon, Sea Cliff, N. Y., assignor to Columbia Ribbon and Carbon Manufacturing Company, Inc., Glen Cove, N. Y.

Application February 17, 1941, Serial No. 379,214

1 Claim. (Cl. 83—8)

My invention relates to machines or mills for dispersing and comminuting materials to an extremely fine state of subdivision and more particularly to improvements in that type of mill which is exemplified by my Patent No. 2,201,889, issued May 21, 1940, and which may be designated as disc mills.

The objects of my invention are to improve the safety and working qualities of the mill and the quality and uniformity of the product produced by it.

In a mill of this type, which consists essentially of a smooth, thin, flexible disc of non-abrasive material rotatable at high speed between two closely adjacent ring grinding surfaces of non-abrasive material, it is of considerable importance that the clearance between the surfaces of the rotatable disc and the grinding rings of the stationary shell be very exactly adjusted and very accurately maintained. When the surfaces are adjusted to provide a very small clearance, a slight change such as may be caused by temperature changes may cause the surfaces to seize and stop the mill. To overcome this difficulty, and to provide a degree of self adjustment between the rings of grinding surfaces and the surfaces of the rotating disc is another object of the present invention.

In reducing my invention to practice I may use a construction such as is shown, by way of example, but in no sense restrictive of the invention, in the accompanying drawing which is a cross section in a vertical plane on a centerline of the mill.

The shell or casing of the mill may be made up of two parts 1 and 2, a disc runner 3 consisting of a thin disc of abrasion resistant material, is positioned between the two parts of the casing with a predetermined clearance between casing parts and runner near the periphery of the disc runner. A shaft 5 having a circular head 6 and to which is fitted a collar 7, provides a means for rotating the disc runner 3. The shaft 5 is provided with a thread 11 and lock nuts 12, by means of which the shaft head 6 and the collar 7 are caused to clamp and tightly hold disc runner 3 between their inner surfaces. Bearings 8 and 9 are carried by sleeve 13 which fits inside the hub of casing member 2, to which it is adjustably attached by cap screws 14 by means of which accurate adjustment of the runner 3 midway between casings 1 and 2 at its periphery 4 is accomplished. Accurate adjustment of the position of the disc runner 3 may be made by varying the thickness of shims 15.

The distance between the two parts 1 and 2 of the casing at the periphery of the disc runner 3 is fixed by the thickness of the circular gasket 16. A secondary internal gasket 17 of soft material such as rubber, is provided to confine the material being comminuted within the shell. The casing member 1 is provided with an outlet opening 18 threaded for pipe connection and in the center of casing member 1 there is provided a feed opening 19, also threaded for pipe connection. The disc runner 3 is provided with a plurality of openings 20 through which material entering the mill through the feed opening 19 on one side of the disc runner 3 may pass to the opposite side. Casing members 1 and 2 are so shaped as to be internally concave thus providing a relatively large volume of space at the center of the disc runner and gradually tapering off toward the periphery of the casing where there are two circular grinding surfaces, 21 on casing member 1 and 22 on casing member 2. The diameters of these two grinding surfaces are such that the outside diameter of one of these surfaces is less than the inside diameter of the other. This improved arrangement of grinding surfaces has the advantage of utilizing the flexibility of the disc runner to prevent binding or freezing of the disc between the grinding surfaces in case they are adjusted too closely or through distortion due to temperature changes they tend to grip the disc.

A mill of this type has a very high degree of dispersive power, depending upon the clearance between the disc and the grinding ring surfaces and the speed of rotation of the disc. Its effectiveness is enhanced by having very minute clearances between the surfaces of the disc and the adjacent grinding surfaces. However, in operation there may be, at times, a very considerable rise in temperature of both the casing members 1 and 2 of which the grinding surfaces form a part, and of the disc itself. Such temperature rises cause expansion of the material of both the casing members and the disc and frequently such expansion is accompanied by a distortion in form which sometimes causes the grinding elements to seize the disc with more or less serious results.

By staggering the grinding rings, that is, by so disposing them on the sides of the disc that they are not opposite each other, I reduce the danger of seizure of the disc by the ring grinding surfaces and at the same time the flexible nature of the disc permits it to adjust itself to a degree to the amount or hardness of the material being dispersed or comminuted. For comminuting the harder grades of material a disc of hard steel or hard alloy may be used. For dispersing certain flocculated materials or comminuting very soft materials a disc of more flexible material, such as rubber, may be used.

I claim:

A disc mill characterized by having two opposed, internally concave, circular casing members, each having a relatively narrow circular internal grinding surface, each parallel to the other, and of substantially different diameters, the outer diameter of one being less than the inner diameter of the other, a thin, smooth surfaced grinding disc having a diameter greater than the outer diameter of the larger grinding surface, rotatable between said grinding surfaces and sufficiently flexible to accommodate itself to changes in the shape of the casing due to temperature variations.

LEWIS M. DIXON.